US011869413B2

(12) United States Patent
Cong et al.

(10) Patent No.: US 11,869,413 B2
(45) **Date of Patent: *Jan. 9, 2024**

(54) PIXEL CIRCUIT, ARRAY SUBSTRATE COMPRISING THE SAME AND DISPLAY PANEL

(71) Applicant: BOE TECHNOLOGY GROUP CO., LTD., Beijing (CN)

(72) Inventors: Ning Cong, Beijing (CN); Minghua Xuan, Beijing (CN); Han Yue, Beijing (CN); Ming Yang, Beijing (CN); Xiaochuan Chen, Beijing (CN); Can Zhang, Beijing (CN); Can Wang, Beijing (CN); Liang Chen, Beijing (CN); Detao Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/652,660

(22) Filed: Feb. 25, 2022

(65) Prior Publication Data

US 2022/0180802 A1 Jun. 9, 2022

Related U.S. Application Data

(63) Continuation of application No. 16/610,007, filed as application No. PCT/CN2019/075026 on Feb. 14, 2019, now Pat. No. 11,315,479.

(30) Foreign Application Priority Data

Jun. 28, 2018 (CN) ........................ 201810685556.7

(51) Int. Cl.
*G09G 3/32* (2016.01)

(52) U.S. Cl.
CPC ....... *G09G 3/32* (2013.01); *G09G 2300/0452* (2013.01); *G09G 2310/0205* (2013.01);
(Continued)

(58) Field of Classification Search
CPC ............. G09G 3/32; G09G 2300/0452; G09G 2320/0233; G09G 2310/08;
(Continued)

(56) References Cited

U.S. PATENT DOCUMENTS

2006/0170636 A1 8/2006 Nakamura et al.
2006/0284801 A1 12/2006 Yoon et al.
(Continued)

FOREIGN PATENT DOCUMENTS

CN 1691861 A 11/2005
CN 1819001 A 8/2006
(Continued)

OTHER PUBLICATIONS

International Preliminary Report on Patentability received for PCT Patent Application No. PCT/CN2019/075026, dated Jan. 7, 2021, 12 pages (7 pages of English Translation and 5 pages of Original Document).
(Continued)

*Primary Examiner* — Muhammad N Edun
(74) *Attorney, Agent, or Firm* — WOMBLE BOND DICKINSON (US) LLP

(57) ABSTRACT

An array substrate including a plurality of pixel units arranged in a matrix is provided. Each pixel unit at least includes a first sub-pixel, a second sub-pixel and a third sub-pixel that emit light of different colors, the first sub-pixel has a lower luminous efficiency than the second and third sub-pixels. The array substrate further comprises a plurality of first gate lines and a plurality of second gate lines that correspond to respective rows of pixel units of the
(Continued)

plurality of pixel units. The first sub-pixel in each row of pixel units of the plurality of pixel units is coupled to a first gate line of the plurality of first gate lines, and the second sub-pixel and the third sub-pixel in the row of pixel units of the plurality of pixel units are both coupled to a second gate line of the plurality of second gate lines.

15 Claims, 9 Drawing Sheets

(52) U.S. Cl.
CPC .............. *G09G 2310/0267* (2013.01); *G09G 2310/0286* (2013.01); *G09G 2310/08* (2013.01); *G09G 2320/0233* (2013.01)

(58) Field of Classification Search
CPC ... G09G 2310/0267; G09G 2310/0205; G09G 2310/0286
See application file for complete search history.

(56) References Cited

U.S. PATENT DOCUMENTS

| | | | |
|---|---|---|---|
| 2007/0182682 | A1 | 8/2007 | Hong et al. |
| 2008/0012804 | A1 | 1/2008 | Kim et al. |
| 2011/0102309 | A1 | 5/2011 | Cho |
| 2012/0133272 | A1 | 5/2012 | Tamaki et al. |
| 2013/0082906 | A1 | 4/2013 | Toyomura et al. |
| 2013/0083000 | A1 | 4/2013 | Toyomura et al. |
| 2014/0117862 | A1 | 5/2014 | Qing et al. |
| 2014/0152639 | A1 | 6/2014 | Bang et al. |
| 2015/0332628 | A1 | 11/2015 | Ren et al. |
| 2016/0125784 | A1 | 5/2016 | Son et al. |
| 2016/0260394 | A1 | 9/2016 | Oh et al. |
| 2016/0300891 | A1 | 10/2016 | Ren |
| 2016/0334684 | A1 | 11/2016 | Li et al. |
| 2017/0221423 | A1 | 8/2017 | Xiang et al. |
| 2017/0330510 | A1 | 11/2017 | Huang et al. |
| 2018/0033382 | A1 | 2/2018 | Tomizawa |
| 2018/0151132 | A1 | 5/2018 | Lee et al. |
| 2019/0114020 | A1 | 4/2019 | Ding et al. |

FOREIGN PATENT DOCUMENTS

| | | | |
|---|---|---|---|
| CN | 1885394 | A | 12/2006 |
| CN | 101017658 | A | 8/2007 |
| CN | 101097685 | A | 1/2008 |
| CN | 101556764 | A | 10/2009 |
| CN | 101742756 | A | 6/2010 |
| CN | 102479484 | A | 5/2012 |
| CN | 102708798 | A | 10/2012 |
| CN | 103035188 | A | 4/2013 |
| CN | 103035189 | A | 4/2013 |
| CN | 103489401 | A | 1/2014 |
| CN | 104360551 | A | 2/2015 |
| CN | 106710525 | A | 5/2017 |
| CN | 107170793 | A | 9/2017 |
| CN | 107633827 | A | 1/2018 |
| CN | 108010489 | A | 5/2018 |
| CN | 108133688 | A | 6/2018 |
| CN | 110021261 | A | 7/2019 |
| EP | 1821282 | A2 | 8/2007 |
| WO | 2020/001037 | A1 | 1/2020 |

OTHER PUBLICATIONS

International Search Report received for PCT Patent Application No. PCT/CN2019/075026, dated May 15, 2019, 6 pages (2 pages of English Translation and 4 pages of Original Document).
Office Action received for Chinese Patent Application No. 201810685556.7, dated Apr. 27, 2020, 21 pages (10 pages of English Translation and 11 pages of Office Action).
Office Action received for Chinese Patent Application No. 202010917995.3, dated Apr. 21, 2021, 20 pages (10 pages of English Translation and 10 pages of Office Action).
Written Opinion received for PCT Patent Application No. PCT/CN2019/075026, dated May 15, 2019, 9 pages (5 pages of English Translation and 4 pages of Original Document).

PIXEL CIRCUIT, ARRAY SUBSTRATE COMPRISING THE SAME AND DISPLAY PANEL

RELATED APPLICATION

The present application is a continuation application based on a U.S. patent application Ser. No. 16/610,007 filed with USPTO on Oct. 31, 2019, which claims the benefit of Chinese Patent Application No. 201810685556.7, filed on Jun. 28, 2018, the entire disclosure of which is incorporated herein by reference.

TECHNICAL FIELD

The present disclosure relates to the field of display technology, and particularly to a pixel circuit, an array substrate comprising the pixel circuit and a display panel.

BACKGROUND

Compared to organic light emitting diodes (OLEDs), micro LEDs have advantages of being all-solid-state, long lifetime, and stability derived from luminescent materials less susceptible to external environment, etc.

However, for a display device applying the micro LEDs, the micro LEDs in the display device typically emit light of different colors. Accordingly, the micro LEDs that emit light of different colors have different luminous efficiencies, which would adversely influence the display effect of the display device.

SUMMARY

An embodiment of the disclosure provides a pixel circuit comprising: a first switching sub-circuit, a second switching sub-circuit, a gray scale control sub-circuit, a driving sub-circuit and a light-emitting element. The first switching sub-circuit is electrically connected with a data line and the gray scale control sub-circuit, the first switching sub-circuit is further connected with a first gate line or a second gate line, the first switching sub-circuit is configured to transmit a data voltage from the data line to the gray scale control sub-circuit under control of a scanning signal from the first gate line or the second gate line. The gray scale control sub-circuit is further electrically connected with an anode of the light-emitting element and the driving sub-circuit, the gray scale control sub-circuit is configured to control a duration during which the driving sub-circuit is electrically connected with the light-emitting element based on the data voltage. The driving sub-circuit is electrically connected with a first operation voltage terminal to receive a first voltage from the first operation voltage terminal. The second switching sub-circuit is electrically connected with a second voltage terminal, the driving sub-circuit and a third gate line, the second switching sub-circuit is configured to transmit a second voltage from the second voltage terminal to the driving sub-circuit under control of a control signal from the third gate line. A cathode of the light-emitting element is electrically connected with a second operation voltage terminal, the driving sub-circuit is configured to provide a constant driving current to the light-emitting element under control of the second voltage from the second voltage terminal, and the light-emitting element is configured to emit light based on the driving current.

In some embodiments, the second voltage is a constant voltage.

In some embodiments, the second voltage enables the light-emitting element connected with the second voltage terminal to operate in a state of a highest luminous efficiency.

In some embodiments, the second voltage enables the light-emitting element connected with the second voltage terminal to operate in a state of a highest luminous efficiency.

In some embodiments, the first switching sub-circuit comprises a first transistor, a gate of the first transistor is electrically connected with the first gate line or the second gate line, a first terminal of the first transistor is electrically connected to the data line, and a second terminal of the first transistor is electrically connected to the gray scale control sub-circuit.

In some embodiments, the gray scale control sub-circuit comprises a second transistor, a gate of the second transistor is electrically connected to the first switching sub-circuit, a first terminal of the second transistor is electrically connected to the driving sub-circuit, and a second terminal of the second transistor is electrically connected to the anode of the light-emitting element.

In some embodiments, the second switching sub-circuit comprises a third transistor, a gate of the third transistor is electrically with the third gate line, a first terminal of the third transistor is electrically with the second voltage terminal, and a second terminal of the third transistor is electrically with the driving sub-circuit.

In some embodiments, the driving sub-circuit comprises a driving transistor, a first terminal of the driving transistor is electrically with the first operation voltage terminal, and a second terminal of the driving transistor is electrically with the gray scale control sub-circuit.

In some embodiments, a width to length ratio of the driving transistor is greater than a width to length ratio of any one of the first transistor, the second transistor and the third transistor.

Another embodiment of the disclosure provides an array substrate, comprising a plurality of pixel units arranged in an array. Each pixel unit of the plurality of pixel units at least comprises a first sub-pixel, a second sub-pixel and a third sub-pixel that are configured to emit light of different colors. Each of the first sub-pixel, the second sub-pixel and the third sub-pixel comprises the pixel circuit according to claim 1, and a luminous efficiency of the first sub-pixel is lower than a luminous efficiency of each of the second sub-pixel and the third sub-pixel, and in each row of pixel units of the plurality of pixel units, the first sub-pixel is connected to the first gate line, the second sub-pixel and the third sub-pixel are connected to the second gate line.

In some embodiments, the array substrate comprises a plurality of third gate lines comprising the third gate line and a plurality of second voltage lines, respective pixel units in a same row of pixel units of the plurality of pixel units are connected with a same third gate line of the plurality of third gate lines, each second voltage line of the plurality of second voltage lines is electrically connected to a corresponding second voltage terminal, and respective sub-pixels of a same column of sub-pixels of the plurality of pixel units are connected to a same second voltage line of the plurality of second voltage lines.

In some embodiments, the plurality of second voltage lines are configured to respectively provide constant voltages of different values to at least two sub-pixels of a row of pixel units of the plurality of pixel units in response to the plurality of pixel units being scanned by a control signal from the third gate line row by row.

In some embodiments, at least one second voltage line of the plurality of second voltage lines is configured to respectively provide constant voltages of different values to at least two sub-pixels of a column of sub-pixels of the plurality of pixel units, the column of sub-pixels of the plurality of pixel units is electrically connected with the at least one second voltage line.

In some embodiments, respective sub-pixels of a same column of pixel units of the plurality of pixel units are electrically connected to a same second voltage line of the plurality of second voltage lines, and the plurality of second voltage lines comprise at least two second voltage lines connected to different second voltage terminals respectively.

In some embodiments, the light-emitting element of the pixel circuit comprises a micro LED.

Another embodiment of the disclosure provides a display panel comprising the array substrate according to the above embodiment.

The above embodiments and the technical features of the embodiments can be combined in any appropriate manners to obtain additional embodiments without conflicts and contradictions. These additional embodiments should fall into the scope of the application.

BRIEF DESCRIPTION OF DRAWINGS

In order to more clearly illustrate the technical solutions in embodiments of the disclosure, the drawings necessary for describing the embodiments will be briefly described below. The drawings mentioned in the description only illustrate some possible embodiments of the disclosure. A person of ordinary skill in the art can obtain other drawings based on these drawings without inventive efforts.

DETAILED DESCRIPTION OF EMBODIMENTS

Next, technical solutions of the embodiments of the disclosure will be set forth clearly and fully in connection with the drawings. The embodiments described are only part of possible embodiments of the disclosure, rather than all of them. Other embodiments that can be conceived by the person of ordinary skill in the art based on the embodiments herein without inventive efforts also fall within the scope of the present application.

The terms such as "first", "second" mentioned herein are only for the purpose of facilitating description, they do not indicate or imply relative importance, neither do they implicitly mean the number of the related technical features. Hence, the technical features modified with the terms such as "first", "second" may explicitly or implicitly indicate that one or more such technical features exist. Unless otherwise noted, the terms "a plurality of" or "multiple" mentioned in the description mean two or more than two.

Figure 1:
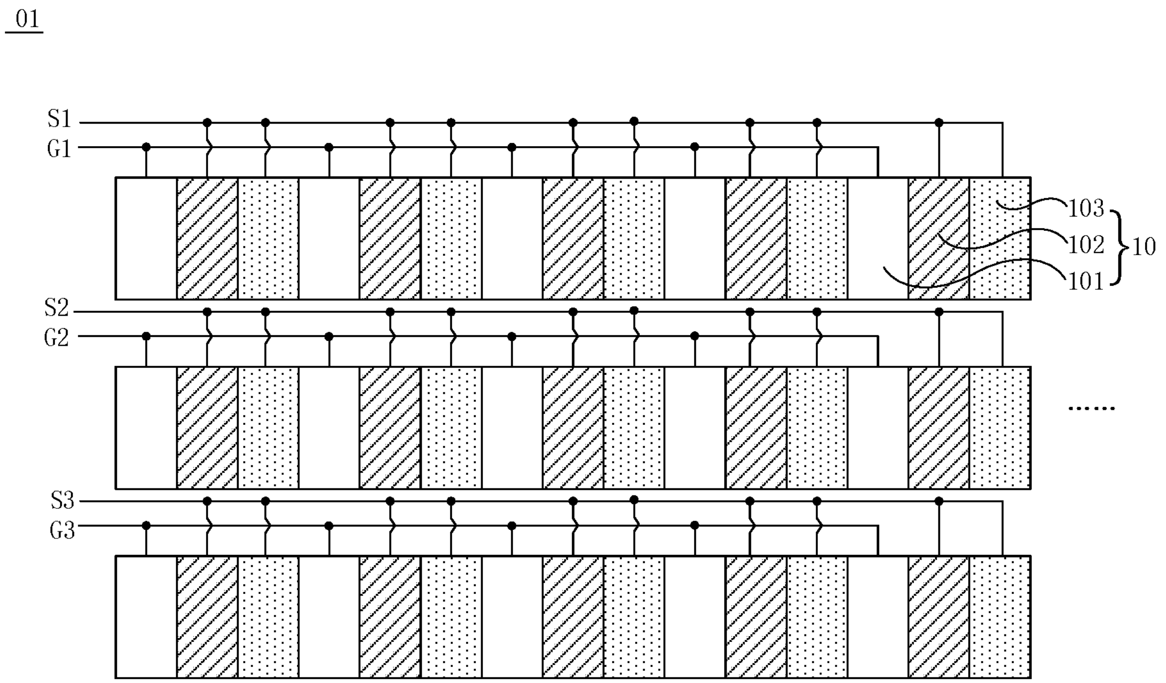
FIG. 1 is a schematic view of an array substrate provided by an embodiment of the disclosure.

FIG. 1 schematically shows an array substrate according to an embodiment of the disclosure. As shown in FIG. 1, the array substrate 01 comprises a plurality of pixel units 10 arranged in a matrix, each pixel unit 10 at least comprises a first sub-pixel 101, a second sub-pixel 102 and a third sub-pixel 103 that emit light of different colors. The colors of light emitted from the first sub-pixel 101, the second sub-pixel 102 and the third sub-pixel 103 are not particularly limited herein, in some embodiments, light emitted from the first sub-pixel 101, the second sub-pixel 102 and the third sub-pixel 103 in a same pixel unit 10 mixes together to enable the pixel unit 10 to emit white light.

According to some embodiments of the disclosure, the first sub-pixel has a lower luminous efficiency than the second sub-pixel and the third sub-pixel. For example, the first sub-pixel 101 may emit red (R) light, the second sub-pixel 102 may emit green (G) light, and the third sub-pixel 103 may emit blue (B) light. But the first sub-pixel, the second sub-pixel and the third sub-pixel are not so limited. The first sub-pixel may be any sub-pixel that has a luminous efficiency higher or lower than an R sub-pixel, the second and third sub-pixels may be any sub-pixels that respectively have luminous efficiencies different from a G sub-pixel and a B sub-pixel. The first sub-pixel, the second sub-pixel and the third sub-pixel of the array substrate provided by the embodiment of the disclosure may have luminous efficiencies completely different from each other. Alternatively, some of the first sub-pixel, the second sub-pixel and the third sub-pixel may have the same luminous efficiency, e.g., any two of the first sub-pixel, the second sub-pixel and the third sub-pixel may have the same luminous efficiency, which is different from the luminous efficiency of the other one of the three sub-pixels.

Referring to FIG. 1, the array substrate further comprises a plurality of first gate lines G1, G2, G3 . . . that respectively correspond to rows of pixel units of the plurality of pixel units arranged in a matrix, and a plurality of second gate lines S1, S2, S3 . . . that respectively correspond to rows of pixel units of the plurality of pixel units arranged in the matrix. Further, the first sub-pixels in each row of pixel units of the plurality of pixel units arranged in the matrix are coupled to the first gate line, the second and third sub-pixels in each row of pixel units of the plurality of pixel units arranged in the matrix are both coupled to the second gate line. The array substrate mentioned herein includes but is not limited to an OLED array substrate, a LED array substrate, an array substrate in a liquid crystal display device.

Figure 2:
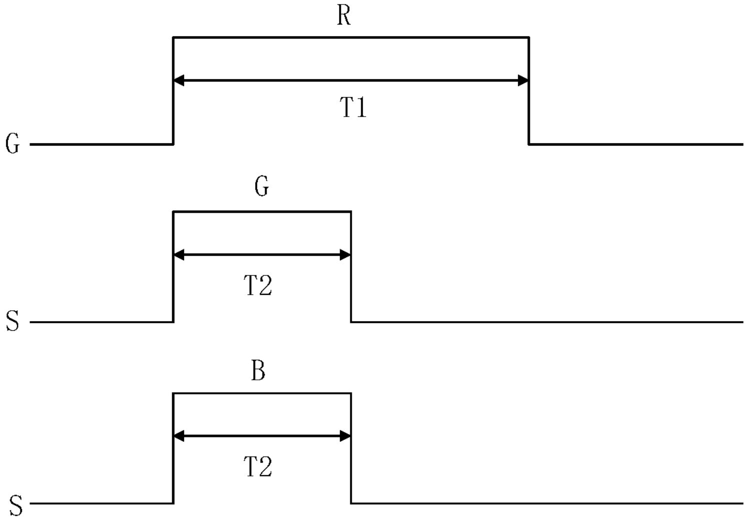
FIG. 2 is a schematic timing diagram of a scanning signal for the array substrate shown in FIG. 1.

In case the first sub-pixel has a lower luminous efficiency than the second sub-pixel and the third sub-pixel, the array substrate provided by the embodiment of the disclosure may be driven with the following method to achieve image display, i.e., providing a first scanning signal and a second scanning signal to the first gate line G and the second gate line S that are coupled to a same row of pixel units 10, respectively, the duration T1 of the effective level of the first scanning signal is greater than the duration T2 of the effective level of the second scanning signal, as shown in FIG. 2.

In this way, it is possible to enable the first sub-pixel 101 to have a longer light-emitting time than the second sub-pixel 102 and the third sub-pixel 103 in the same row of pixel units 10, thereby prolonging the light-emitting time for the first sub-pixel 101 having a relatively low luminous efficiency, so as to compensate for brightness of the first sub-pixel 101, such that the first sub-pixel 101 has a brightness that is same or substantially identical to that of the second sub-pixel 102 and the third sub-pixel 103. As a result, the display effect could be improved.

In case each of the second and third sub-pixels has a lower luminous efficiency than the first sub-pixel, the array substrate may be driven with the following method to achieve image display, i.e., providing a first scanning signal and a second scanning signal to the first gate line G and the second gate line S that are coupled to a same row of pixel units 10, respectively, the effective level of the second scanning signal has a longer duration than the is effective level of the first scanning signal. In this way, it is possible to enable the second sub-pixel 102 and the third sub-pixel 103 to have a longer light-emitting time than the first sub-pixel 101 in the same row of pixel units 10, so as to compensate for brightness of the second sub-pixel 102 and the third sub-pixel 103 having a relatively low luminous efficiency, such that the first sub-pixel 101, the second sub-pixel 102 and the third sub-pixel 103 have a similar or substantially same brightness, thereby improving the display effect.

For the sake of brevity, in the following, the array substrate and a method for driving the array substrate provided by the embodiments of the disclosure will be illustrated by taking the case of the first sub-pixel having a lower luminous efficiency than the second sub-pixel and the third sub-pixel as an example.

According to some embodiments of the disclosure, the plurality of first gate lines corresponding to rows of pixel units of the plurality of pixel units arranged in a matrix comprise at least one gate line group, each gate line group comprises at least two adjacent first gate lines of the plurality of first gate lines, and the first gate lines of the gate line group are configured to receive a same scanning signal. In an example shown in FIG. 3, two gate line groups 20 are schematically shown, each gate line group comprises two adjacent first gate lines, i.e., the first gate line G1 corresponding to the first row of pixel units and the first gate line G2 corresponding to the second row of pixel units, or the first gate line G3 corresponding to the third row of pixel units and the first gate line G4 corresponding to the fourth row of pixel units. In some embodiments, the first gate lines included in any two different gate line groups are different, that is, any single first gate line is not shared by two or more gate line groups. As discussed previously, all first gate lines G of each gate line group 20 are configured to receive the same scanning signal at the same time. For example, all first gate lines G of each gate line group 20 receive the first scanning signal simultaneously, in this case, all first gate lines G in the same gate line group 20 are scanned at the same time, accordingly, the first sub-pixels 101 coupled to the first gate lines G in the same gate line group 20 would be turned on simultaneously to emit light, and have a same light-emitting time duration.

Therefore, the first scanning signal (e.g., having an effective level of duration T1) can be supplied to N first gate lines G of a gate line group 20 at the same time, N is integer greater than or equal to 2. Meanwhile, the second scanning signal could be provided in sequence to N second gate lines S corresponding to the rows of pixel units coupled to the N first gate lines. In this case, the second sub-pixels 102 and the third sub-pixels 103 coupled to the N second gate lines S would be turned on row by row, while the first sub-pixels 101 coupled to the N first gate lines G maintain in a turned-on state during the time period T1. In this way, the light-emitting time for a first sub-pixel 101 coupled to the first gate lines in the gate line group 20 is N times greater than the light-emitting time for the second sub-pixel 102, the third sub-pixel 103 that are in the same row with the first sub-pixel 101.

Accordingly, the first scanning signal may be provided in the following manner to drive the pixel units to display: providing the first scanning signal to a plurality of gate line groups 20 in sequence, i.e., the gate line groups 20 are scanned group by group with the first scanning signal.

Figure 3:
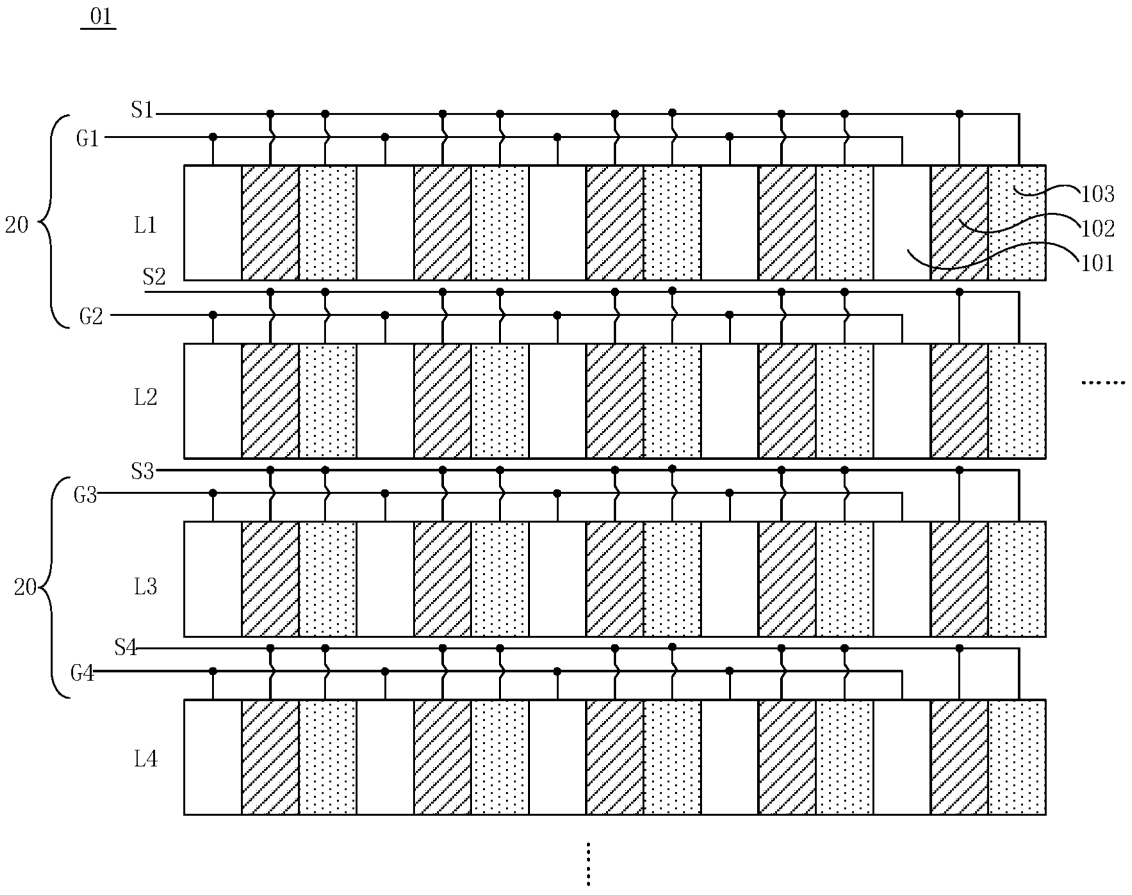
FIG. 3 is a schematic view of an array substrate provided by another embodiment of the disclosure.
Figure 4:
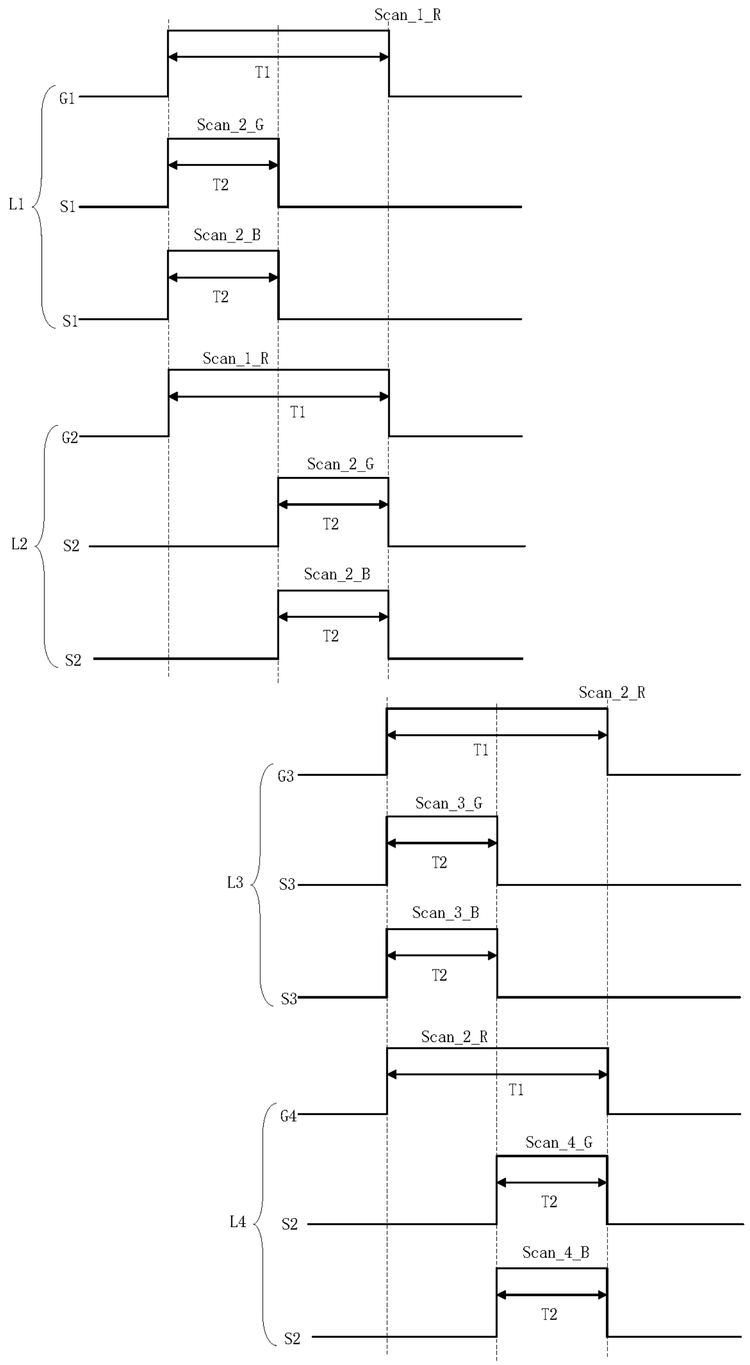
FIG. 4 is a schematic timing diagram of a scanning signal for the array substrate shown in FIG. 3.

As an example, a first scanning signal Scan_1_R shown in FIG. 4 may firstly be provided to two first gate lines G1, G2 in FIG. 3, which correspond to a first row (L1) of pixel units and a second row (L2) of pixel units respectively and constitute a gate line group 20. Then, as shown in FIG. 4, the first scanning signal Scan_2_R is provided to two first gate lines G3, G4 in FIG. 3, which correspond to a third row (L3) of pixel units and a fourth row (L4) of pixel units respectively and constitute a gate line group 20. The remaining gate line groups 20 may be scanned in a similar way.

Therefore, the first scanning signal can be provided to N first gate lines G of the gate line group 20 simultaneously to drive the pixel units of the array substrate provided by the embodiment of the disclosure. As an example, the first scanning signal Scan_1 as shown in FIG. 4 is provided to the first gate line G1 corresponding to the first row (L1) of pixel units and the first gate line G2 corresponding to the second row (L2) of pixel units at the same time. At that time, the first sub-pixels 101 in the first row and the second row emit red (R) light.

Meanwhile, N second gate lines S corresponding to the N rows of pixel units coupled to the N first gate lines G are provided with a second scanning signal Scan_2 in sequence. As an example, referring to FIG. 4, firstly, the second scanning signal Scan_2 is provided to the second gate line S1 corresponding to the first row of pixel units 10, then, the second gate line S2 corresponding to the second row of pixel units 10 is supplied with the second scanning signal Scan_2. The duration T2 of the effective level of the second scanning signal Scan_2 is N times less than the duration T1 of the effective level of the first scanning signal Scan_1.

As an example, as shown in FIG. 3, a single gate line group 20 comprises two first gate lines G1, G2 that are adjacent to each other. In this case, as shown in FIG. 4, the duration T2 of the effective level of the second scanning signal Scan_2 is two times less than the duration T1 of the effective level of the first scanning signal Scan_1.

In such an example, as shown in FIG. 4, during the first half of the time when the first sub-pixels 101 (R) in the first row of pixel units and the second row of pixel units emit light, the second sub-pixels 102 (G) and the third sub-pixels 103 (B) in the first row of pixel units emit light, and during the second half of the time when the first sub-pixels 101 (R) in the first row of pixel units and the second row of pixel units emit light, the second sub-pixels 102 (G) and the third sub-pixels 103 (B) in the second row of pixel units emit light. Therefore, for each row of pixel units, the light-emitting time for the second sub-pixel 102 (G) or the third sub-pixel 103 (B) is half of the light-emitting time for the first sub-pixel 101 (R).

Figure 5:
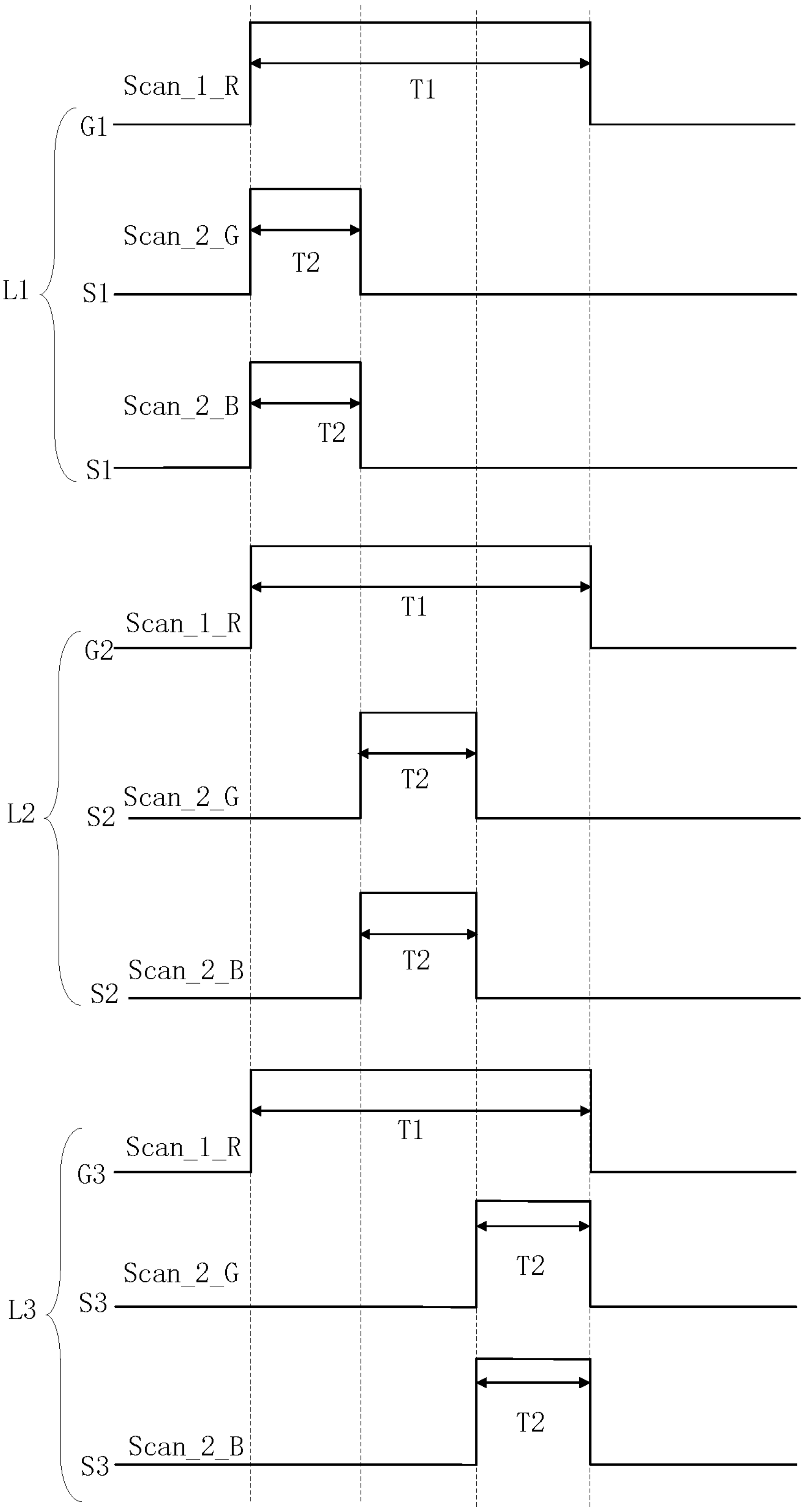
FIG. 5 is a schematic timing diagram of a scanning signal according to another embodiment of the disclosure.

Similarly, in case a gate line group 20 comprises three first gate lines G that are adjacent to each other, as shown in FIG. 5, the duration T2 of the effective level of the second scanning signal Scan_2 is three times less than the duration T1 of the effective level of the first scanning signal Scan_1. In this case, for each row of pixel units, the light-emitting time for the second sub-pixel 102 (G) or the third sub-pixel 103 (B) is one third of the light-emitting time for the first sub-pixel 101 (R).

The person of ordinary skill in the art may set the number of the first gate lines G included in a single gate line group 20 as needed, so that the brightness of the first sub-pixel 101 (R) in a single pixel unit 10 is similar or substantially identical to that of the second sub-pixel 102 (G) and the third sub-pixel 103 (B) in the same pixel unit 10 during a time period for displaying a frame of image, thereby facilitating achieving white balance for the pixel unit 10.

If the first sub-pixel 101 has a luminous efficiency that differs significantly from the luminous efficiency of the second sub-pixel 102 and the third sub-pixel 103, the single gate line group 20 may have more number of first gate lines G. Otherwise, each gate line group 20 may comprise less first gate lines G.

The above embodiments are illustrated by taking a case where a single gate line group 20 comprises two or three adjacent first gate lines as an example. In case each gate line group 20 comprises other numbers of first gate lines G, the first scanning signal Scan_1 and the second scanning signal Scan_2 may be provided in a similar way, and the control to the light-emitting time for the first sub-pixel 101 (R), the second sub-pixel 102 (G) and the third sub-pixel 103 (B) is also similar to the above embodiments, which will not be repeated herein.

Figure 6:
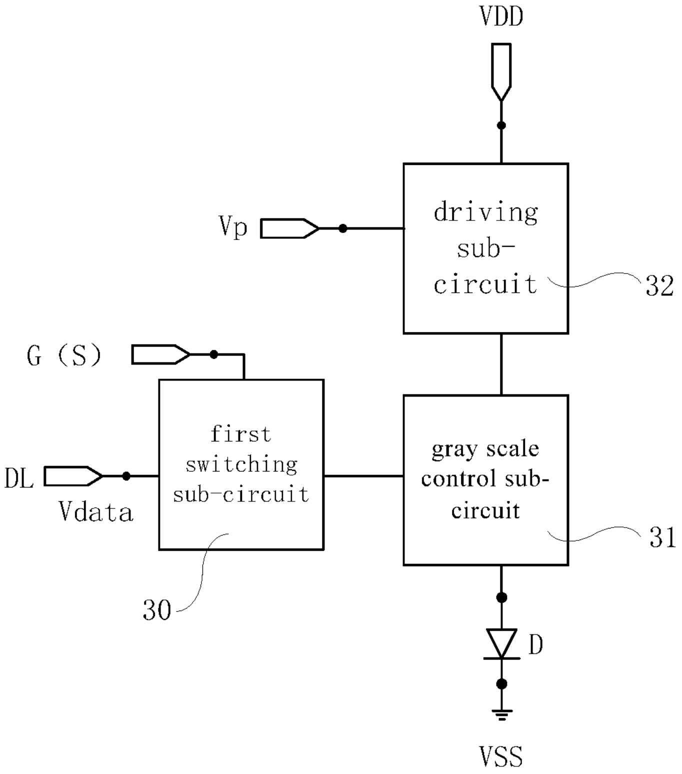
FIG. 6 schematically shows a view of a pixel circuit according to an embodiment of the disclosure.

As discussed previously, the array substrate according to the embodiments of the disclosure is applicable to an OLED display panel or a LED display panel. In some embodiments, as shown in FIG. 6, each sub-pixel (e.g., the first sub-pixel 101, the second sub-pixel 102 and the third sub-pixel 103) of a pixel unit of the array substrate comprises a light-emitting element D and a pixel circuit for controlling the light-emitting element D to emit light. The pixel circuit comprises a first switching sub-circuit 30, a gray scale control sub-circuit 31 and a driving sub-circuit 32. In some embodiments of the disclosure, the light-emitting element D may comprise a micro LED. In other embodiment, the light-emitting element D may be diodes of other types, such as an OLED.

The first switching sub-circuit 30 is coupled to a data line DL, the gray scale control sub-circuit 31 and a gate line (e.g., the first gate line or the second gate line) corresponding to a sub-pixel where the pixel circuit locates. In case the pixel circuit is located within the first sub-pixel 101, the first switching sub-circuit 30 in the pixel circuit is coupled to the first gate line G. In case the pixel circuit is located within the second sub-pixel 102 or the third sub-pixel 103, the first switching sub-circuit 30 in the pixel circuit is coupled to the second gate line S.

The first switching sub-circuit 30 is configured to transfer a data voltage Vdata outputted by the date line DL to the gray scale control sub-circuit 31 under control of the scanning signal received by the first gate line G or the second gate line S.

The driving sub-circuit 32 is further coupled to a second voltage terminal and a first operation voltage terminal. The other terminal of the light-emitting element D is coupled to a reference voltage terminal VSS. The driving sub-circuit 32 is configured to provide a constant driving current I to the light-emitting element D based on a voltage difference between a first operation voltage VDD and a second voltage Vp under control of the second voltage Vp from the second voltage terminal. The first operation voltage VDD from the first operation voltage terminal and the reference voltage VSS from the reference voltage terminal generate potential difference for the current path of the driving current I. The amplitude of the driving current I is related to the values of the second voltage Vp and the first operation voltage VDD. The light-emitting element D emits light according to the driving current I.

The gray scale control sub-circuit 31 is coupled to the driving sub-circuit 32 and a terminal of the light-emitting element D. The gray scale control sub-circuit 31 is configured to control the duration during which the driving sub-circuit 32 and the light-emitting element D are electrically connected based on the data voltage Vdata. That is, the gray scale control sub-circuit 31 controls the time duration during which the driving current I flows through the light-emitting element D based on the data voltage Vdata.

In some embodiments, the first operation voltage VDD provided at the first operation voltage terminal is a high level, whereas the reference voltage at the reference voltage terminal VSS is a low level or has a ground potential.

The second voltage Vp may be a constant voltage, so that the driving sub-circuit 32 provides a constant driving current I to the light-emitting element D, which in turn facilitates the light-emitting element D to have a stable luminous performance. In some embodiments, the second voltage Vp may be changed by manually or automatically change in response to external factors.

Figure 7:
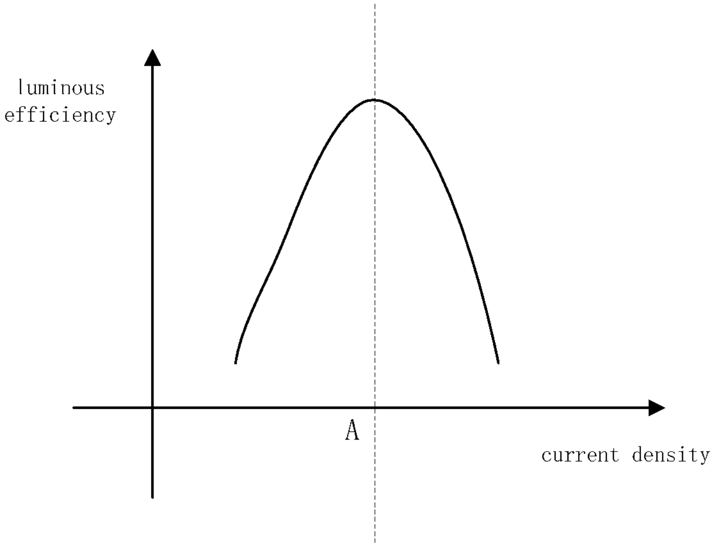
FIG. 7 schematically shows a curve indicating the relationship between the current density and the luminous efficiency for a micro LED according to an embodiment of the present disclosure.

For the light-emitting element D in a single sub-pixel, a relationship between the luminous efficiency and the current density for the light-emitting element is available, which is related to the nature of the light-emitting element itself and can be obtained by experiments and calculation. The current density refers to a ratio of a current flowing through the light-emitting element and a light-emitting area of the light-emitting element, the luminous efficiency may be represented as a ratio of brightness of light-emitting element and the current. As an example, FIG. 7 illustrates a view of curve showing the relationship between the luminous efficiency and current density for a micro LED. As can be seen, the micro LED has a highest luminous efficiency when the current density has a value of A. In order to enable the micro LEDs in the first sub-pixel 101, the second sub-pixel 102 or the third sub-pixel 103 to have a relatively high luminous efficiency, the value of the second voltage Vp at the second voltage terminal can be set or adjusted, so that the driving sub-circuit 32 supplies a suitable constant driving current to the micro LED, which constant driving current makes the micro LED have a current density A. In this way, it is possible that the micro LEDs in respective sub-pixels operate in a state of a highest luminous efficiency, which is advantageous to improving the luminous efficiency and light-emitting stability of the light-emitting element D.

It should be well appreciated that FIG. 7 are only an example illustration of the relationship between the luminous efficiency and current density of the micro LED, the relationship curves for different types or kinds of micro LEDs may be different.

Additionally, micro LEDs that emit light of different colors may differ in the curves of the relationship between the luminous efficiency and current density. In an example, in the curves of the relationships between the luminous efficiency and current density for the micro LED emitting red light in the first sub-pixel 101, the micro LED emitting green light in the second sub-pixel 102 and the micro LED emitting blue light in the third sub-pixel 103, the values of current densities corresponding to a high luminous efficiency may be different. Therefore, the second voltages for the pixel circuits in the first sub-pixel 101, the second sub-pixel 102 and the third sub-pixel 103 may differ in value.

In some embodiments, pixel circuits in multiple sub-pixels that emit light of the same color may be electrically connected to a same second voltage terminal. As an example, the pixel circuits in the first sub-pixels 101 of the same column are electrically connected to the same second voltage terminal, the pixel circuits in the second sub-pixels 102 of the same column are electrically connected to the same second voltage terminal, and the pixel circuits in the third sub-pixels 103 of the same column are electrically connected to the same second voltage terminal.

Figure 8:
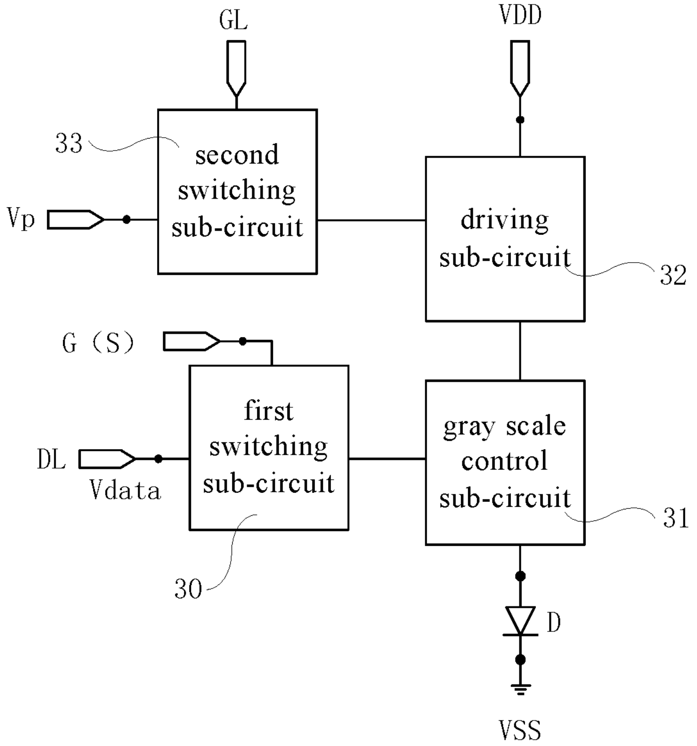
FIG. 8 schematically shows a view of a pixel circuit according to another embodiment of the disclosure.

According to other embodiments of the disclosure, as shown in FIG. 8, the pixel circuit in each sub-pixel may further comprise a second switching sub-circuit 33.

The second switching sub-circuit 33 is electrically connected to the second voltage terminal, the driving sub-circuit 32 and a third gate line GL. The second switching sub-circuit 33 is configured to transmit the second voltage Vp at the second voltage terminal to the driving sub-circuit under control of the control signal transferred by the third gate line GL. In this example, the second voltage Vp can be outputted to the driving sub-circuit 32 only if the second switching sub-circuit is turned on by the control signal transferred by the third gate line GL. In this way, the driving sub-circuit 32 does not have to keep in a turned-on state, instead, the driving sub-circuit 32 receives the second voltage Vp when the second switching sub-circuit is turned on as needed, thereby providing the driving current I to the light-emitting element D.

The disclosure does not have any limitation regarding when to turn on the second switching sub-circuit 33 by the third gate line GL, as long as the third gate line GL controls the second switching sub-circuit 33 to be turned on before the signal from the first gate line G or the second gate line S turns on the first switching sub-circuit 30.

Figure 9:
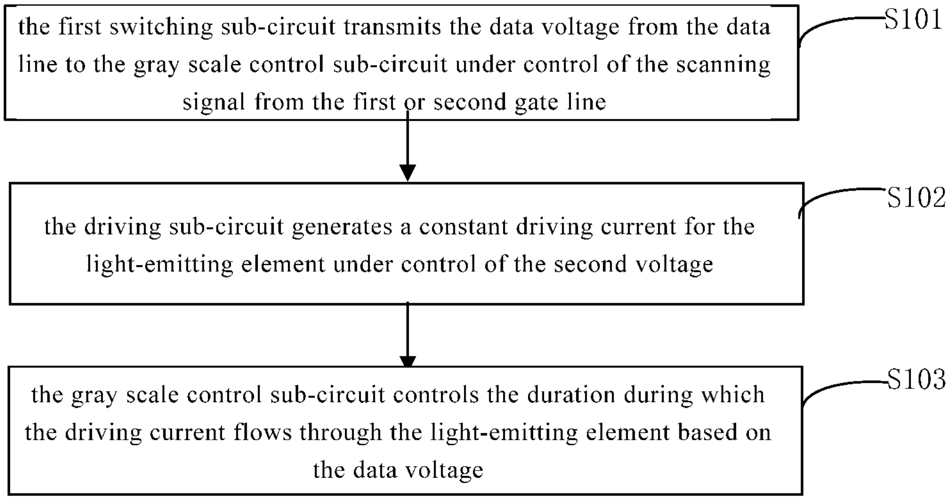
FIG. 9 is a flow chart of a method for driving an array substrate as provided by an embodiment of the present disclosure.

Based on the pixel circuit shown in FIG. 6, some embodiments of the disclosure provide a method for driving an array substrate, which comprises steps S101 to S103, as shown in FIG. 9.

S101, the first switching sub-circuit 30 transmits the data voltage Vdata from the data line DL to the gray scale control sub-circuit 31 under control of the scanning signal from the first gate line G or the second gate line S. The first gate line G or the second gate line S may control the first switching sub-circuit 30 to be turned on. The data voltage Vdata may be transmitted to the gray scale control sub-circuit 31 through the first switching sub-circuit 30 if the first switching sub-circuit 30 is turned on.

S102, the driving sub-circuit 32 generates a constant driving current I for the light-emitting element D based on the voltage difference between the first operation voltage VDD and the second voltage Vp under control of the second voltage Vp.

S103, the gray scale control sub-circuit 31 controls the duration during which the driving current I flows through the light-emitting element D based on the data voltage Vdata.

The data voltage Vdata controls the gray scale control sub-circuit 31 to be turned on, so that the driving sub-circuit 32 is electrically connected to the light emitting element D. The driving sub-circuit 32 would be electrically disconnected from the light emitting element D when the gray scale control sub-circuit 31 is turned off.

It should be appreciated that, different steps are indicated with S101, S102 and S103 in FIG. 9, but the order to execute the steps is not so limited. These steps may be executed in other different orders, or some of the steps may be executed at the same time.

As shown in FIG. 8, in case the pixel circuit further comprises the second switching sub-circuit 33, the method for driving the array substrate may comprise the following step before the step S101: the second switching sub-circuit 33 transmits the second voltage to the driving sub-circuit 32 under control of the third gate line GL. In this way, the driving sub-circuit 32 is in an active state to receive the second voltage only if the second switching sub-circuit 33 is turned on by the third gate line GL.

Next, the sub-circuits illustrated in FIG. 6 or FIG. 8 will be described in detail.

Figure 10:
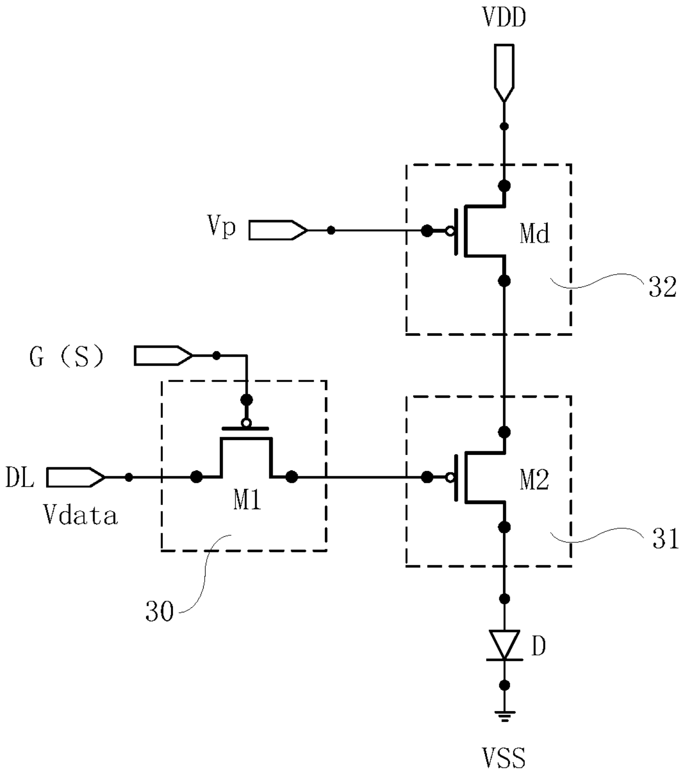
FIG. 10 is a specific structural view of a pixel circuit according to another embodiment of the disclosure.

As an example, as shown in FIG. 10, the first switching sub-circuit 30 includes a first transistor M1. A gate of the first transistor M1 is electrically connected to the first gate line G or the second gate line S, a first terminal thereof is electrically connected to the data line DL, and a second terminal thereof is electrically connected to the gray scale control sub-circuit 31.

The gray scale control sub-circuit 31 includes a second transistor M2. A gate of the second transistor M2 is electrically connected to the second terminal of the first transistor M1, a first terminal of the second transistor M2 is electrically connected to the driving sub-circuit 32, and a second terminal of the second transistor M2 is electrically connected to an anode of the light-emitting element D.

The driving sub-circuit 32 comprises a driving transistor Md. In the example shown in FIG. 6, a gate of the driving transistor Md is electrically connected to the second voltage terminal, a first terminal thereof is electrically connected to the first operation voltage terminal, and a second terminal thereof is electrically connected to the first terminal of the second transistor M2 of the gray scale control sub-circuit 31.

Figure 11:
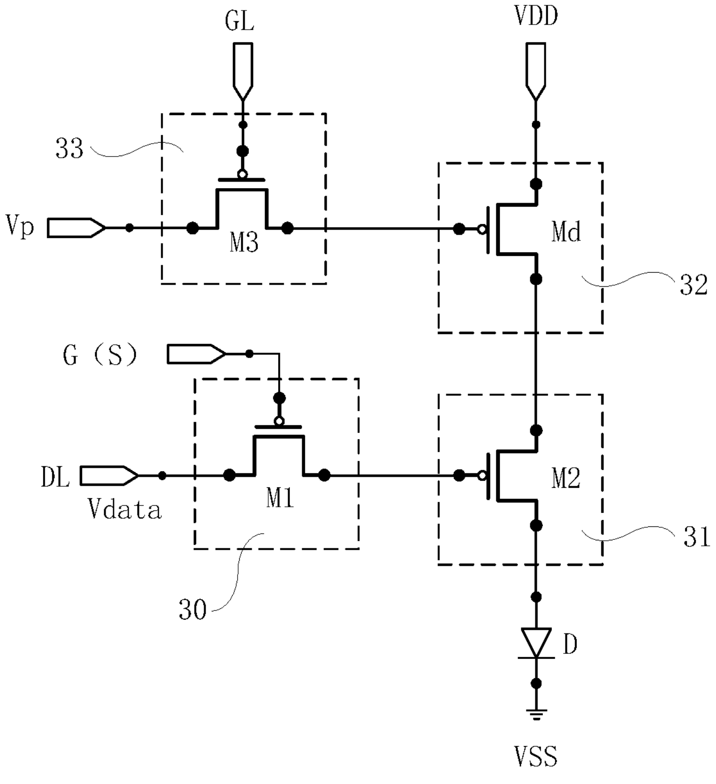
FIG. 11 is a specific structural view of a pixel circuit according to yet another embodiment of the disclosure.

FIG. 11 illustrates a pixel circuit according to another embodiment of the disclosure, which includes the second switching sub-circuit 33. As shown in FIG. 11, the second switching sub-circuit 33 comprises a third transistor M3. A gate of the third transistor M3 is coupled to the third gate line GL, a first terminal thereof is electrically connected to the second voltage terminal, and a second terminal thereof is electrically connected to the driving transistor Md of the driving sub-circuit 32. In this case, the gate of the driving transistor Md is coupled to the second voltage terminal through the third transistor M3 if the third transistor M3 is turned on.

It is to be noted that, the transistors mentioned above may be N-type transistors or P-type transistors. FIG. 10 and FIG. 11 illustrate examples where all the transistors are P-type transistors. In addition, for the transistors, the first terminal may represent a source, and the second terminal may mean a drain. Alternatively, the first terminal may refer to the drain, and the second terminal represents the source. The application does not have any limitation in this respect.

The driving transistor Md is required to generate the driving current I for driving the light-emitting element D to emit light, so the driving transistor Md needs to have a suitable load capacity. Therefore, the driving transistor Md may have a greater width to length ratio than the first transistor M1, the second transistor M2 and the third transistor M3.

In the following, the operation process of the pixel circuit will be set forth by taking the pixel circuit shown in FIG. 11 as an example.

At first, the third gate line GL receives a signal of low level to turn on the third transistor M3, thereby a constant voltage from the constant voltage source Vp is transmitted to the gate of the driving transistor Md, thereby the driving transistor Md is turned on.

In this case, the driving transistor Md is enabled to operate in a saturation region under control of a suitable second voltage from the second voltage terminal, so a constant driving current I can be supplied to the light-emitting element D through the driving transistor Md. The amplitude of the driving current I is related to the second voltage from the second voltage terminal and the first operation voltage VDD from the first operation voltage terminal.

If the driving transistor Md operates in the saturation region all the time, parameters such as the threshold voltage (Vth) of the driving transistor Md may drift, which would affect the stability of the driving current I. In the pixel circuit shown in FIG. 11, with the third transistor M3 which is controlled to be turned on and turned off by the third gate line GL, it is possible that the driving transistor Md operates in the saturation region only if the third transistor M3 is turned on, thereby the problem that the threshold voltage of the driving transistor Md drifts may be alleviated or mitigated.

Thereafter, the first gate line G or the second gate line S receives a low level. Therefore, the first transistor M1 is turned on, the data voltage Vdata is transmitted to the gate of the second transistor M2, causing the second transistor M2 to be turned on.

The second transistor M2 functions as a switch transistor. When the second transistor M2 is turned on, the driving current I from the driving transistor Md flows to the light-emitting element D through the second transistor M2, the light-emitting element D emits light in response to receiving the driving current I.

As previously mentioned, the amplitude of the driving current I is related to the second voltage from the second voltage terminal, therefore, the second voltage from the second voltage terminal may be set or adjusted to generate a suitable driving current, which enables the light-emitting element D to have a current density corresponding to a relatively high luminous efficiency of the light emitting element.

Figure 12:
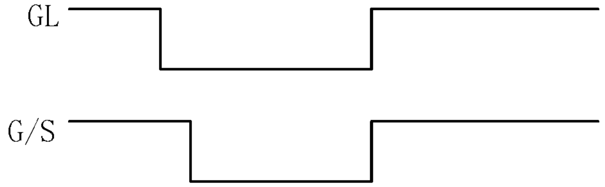
FIG. 12 are schematic views of timing diagrams for the control signal from the third gate line and the scanning signal from the first or second gate line according to another embodiment of the disclosure.

According to an embodiment of the disclosure, the signal outputted by the first gate line G or the second gate line S has a certain delay relative to the control signal provided by the third gate line GL, as shown in FIG. 12. In this way, a stable driving current I can be generated from the driving transistor Md, which subsequent flows to the light-emitting element D through the second transistor M2, thereby further ensuring the light-emitting element D operates in a state where the current density of the light-emitting element results in a high luminous efficiency.

In some embodiments, the duration of the effective level of the data voltage Vdata from the data line DL may be modulated by way of PWM (Pulse Width Modulation). In this way, the duration during which the first transistor M1 is turned on can be controlled, thereby controlling the effective time duration during which the driving current I flows through the light-emitting element D. Accordingly, the brightness of the light-emitting element D and gray scale corresponding to the brightness may be adjusted.

Figure 13:
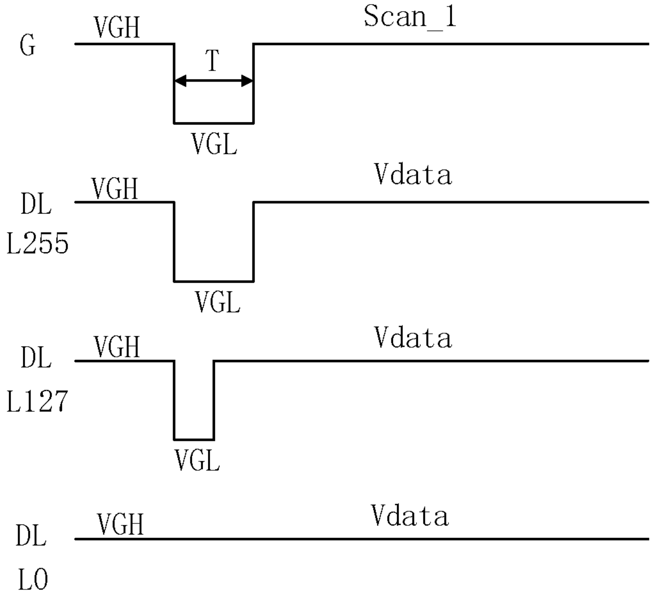
FIG. 13 illustrates waveforms of data signal for adjusting the gray scale of a single sub-pixel according to another embodiment of the disclosure.

As an example, as shown in FIG. 13, if the first sub-pixel 101 including the pixel circuit needs to display a gray scale of L255, the first scanning signal Scan_1 (as shown in FIG. 13 by taking a low level VGL as an example) can be provided to the first gate line G electrically connected to the gate of the first transistor M1 in the first sub-pixel 101, so as to turn on the first transistor M1. In this case, during the time period T during which the first transistor M1 is turned on, for the data voltage Vdata provided to the gate of the second transistor M2 through the first transistor M1 by the data line DL, the low level VGL has a duration equal to the time period T during which the first transistor M1 is turned on.

Alternatively, when the first sub-pixel 101 including the pixel circuit is to display a gray scale of L127, for the data voltage Vdata provided to the gate of the second transistor M2 through the first transistor M1 by the data line DL within the time period T during which the first transistor M1 is turned on, the duration of the low level VGL is about 50% (for the sake of convenience, 50% is used hereinafter) of the time period T during which the first transistor M1 is turned on.

If the first sub-pixel 101 including the pixel circuit is to display a gray scale of L0, for the data voltage Vdata provided to the gate of the second transistor M2 through the first transistor M1 by the data line DL within the time period T during which the first transistor M1 is turned on, the duration of the low level VGL is 0.

In case the first sub-pixel 101 including the pixel circuit needs to display a gray scale L (L127<L<L255), for the data voltage Vdata provided to the gate of the second transistor M2 through the first transistor M1 by the data line DL within the time period T during which the first transistor M1 is turned on, the duration P of the low level VGL may satisfy the following expression: 50%*T<P<100%*T.

In case the first sub-pixel 101 including the pixel circuit needs to display a gray scale L (L0<L<L127), for the data voltage Vdata provided to the gate of the second transistor M2 through the first transistor M1 by the data line DL within the time period T during which the first transistor M1 is turned on, the duration P of the low level VGL may satisfy the following expression: 0*T<P<50%*T.

In the above, the embodiments of the disclosure are described by taking the first sub-pixel 101 as an example. Similarly, when the second sub-pixel 102 or the third sub-pixel 103 displays gray scales, the duty cycle of the second scanning signal Scan_2 provided from the second gate line S coupled to the gate of the first transistor M1 in the second sub-pixel 102 or the third sub-pixel 103 within a scan time for scanning a row of pixel units may be controlled.

Figure 14:
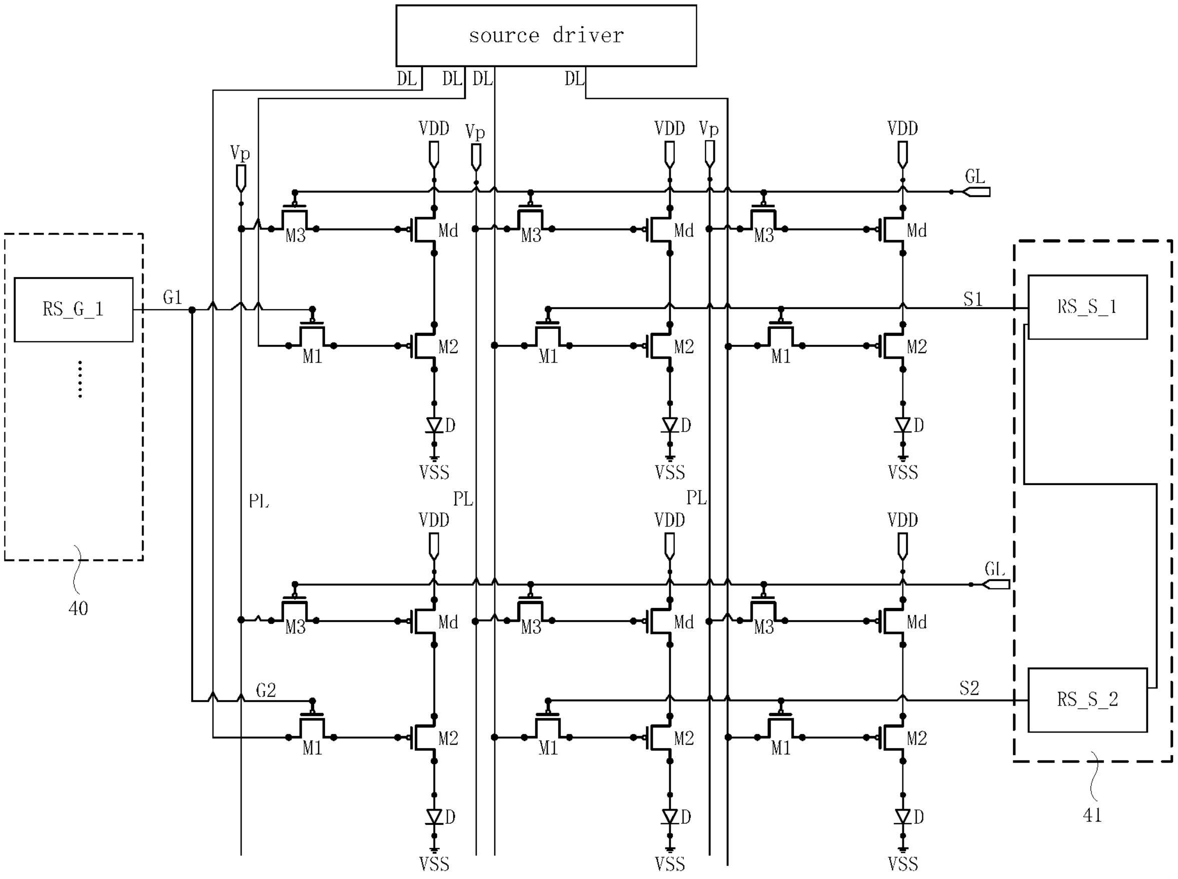
FIG. 14 illustrates a view of a display panel provided by another embodiment of the disclosure.

According to other embodiments of the disclosure, the array substrate comprises a gate driving circuit. In some embodiments, the gate driving circuit is arranged in a wiring area of the array substrate that surrounds a pixel area. FIG. 14 illustrates an example of gate driving circuit, which comprises a first gate driving sub-circuit 40 and a second gate driving sub-circuit 41. The first gate driving sub-circuit 40 is coupled to the plurality of first gate lines to provide the first scanning signal to the plurality of first gate lines. The second gate driving sub-circuit 41 is coupled to the plurality of second gate lines to provide the second scanning signal to the plurality of second gate lines. The first gate driving sub-circuit 40 and the second gate driving sub-circuit 41 may be fabricated in a form of an Integrated Circuit (IC), and arranged in the wiring area by means of bonding process. Alternatively, they may be fabricated on a glass substrate of the array substrate 01 in the form of GOA (gate driver on array), which would not limit the first gate driving sub-circuit 40 and the second gate driving sub-circuit 41.

Next, the first gate driving sub-circuit 40 and the second gate driving sub-circuit 41 will be described in detail.

As shown in FIG. 14, the first gate driving sub-circuit 40 is coupled to a plurality of first gate lines G1 corresponding to respective rows of pixel units. The plurality of first gate lines may comprise at least one gate line group, each gate line group comprising at least two adjacent first gate lines. The first gate driving sub-circuit comprises a plurality of cascaded first shift registers, each first shift register is coupled to a corresponding gate line group to provide the first scanning signal to respective first gate lines in the gate line group simultaneously. The second gate driving sub-circuit comprises a plurality of cascaded second shift registers, each second shift register is coupled to a corresponding second gate line to provide the second scanning signal to the second gate line.

As shown in FIG. 14, the first gate driving sub-circuit 40 is configured to provide the first scanning signal Scan_1 to a plurality of gate line groups in sequence, each gate line group comprising a first gate lines G1 and G2. The second gate driving sub-circuit 41 is coupled to the second gate line S1, S2 . . . . The second gate driving sub-circuit 41 is configured to provide the second scanning signal Scan_2 to a plurality of second gate lines S1, S2 . . . in sequence.

In some embodiments of the disclosure, as shown in FIG. 14, the first gate driving sub-circuit 40 comprises a plurality of cascaded first shift registers RS_G_1, RS_G_2 . . . . Each first shift register is coupled to a gate line group 20, different first shift registers are coupled to different gate line groups 20. In this example, the first scanning signal Scan_1 outputted from a single first shift register may be simultaneously provided to the whole first gate lines (e.g., gate lines G1, G2) in the gate line group 20 coupled to the first shift register.

The second gate driving sub-circuit 41 comprises a plurality of cascaded second shift registers RS_S_1, RS_S_2 . . . . Each second shift register is coupled to a second gate line (S1, S2, . . . ). In this example, the second scanning signal Scan_2outputted from a single second shift register (e.g. RS_S_1) may be provided to a second gate line (e.g., gate line S1) coupled to the second shift register (e.g. RS_S_1).

The shift register mentioned herein refers to a circuit that receives an input signal and generates an output signal whose phase is shifted relative to that of the input signal. For the shift register applied in the array substrate of the disclosure, the generated output signal is just the first or second scanning signal mentioned herein. The circuit of a single shift register is well-known to a person of ordinary skill in the art, which will be not described in detail herein.

In order to reduce the size of the wiring area of the array substrate and enable the wiring areas on either side of the display area to have an identical or substantially same area value, in some embodiments of the disclosure, the first gate driving sub-circuit 40 and the second gate driving sub-circuit 41 are located in either side of the display area, as shown in FIG. 14.

In some other embodiments, the array substrate further includes a source driving circuit coupled to the data line DL. Since all the first gate lines G in the same gate line group 20 may be scanned simultaneously, the sub-pixels controlled by the first gate lines G of the same gate line group 20 may receive date voltages from different data lines DL, respectively, so that the gray scale displayed by the sub-pixels can be independently controlled.

The array substrate provided by the embodiment of the disclosure can be further described by means of FIG. 14. The array substrate includes the pixel circuit as described with reference to FIG. 8 or 11. The array substrate comprises a plurality of pixel units arranged in an array, each pixel unit of the plurality of pixel units at least comprises a first sub-pixel, a second sub-pixel and a third sub-pixel that are configured to emit light of different colors, Each of the first sub-pixel, the second sub-pixel and the third sub-pixel comprises the pixel circuit as described in the foregoing embodiment, and a luminous efficiency of the first sub-pixel is lower than a luminous efficiency of each of the second sub-pixel and the third sub-pixel. In each row of pixel units of the plurality of pixel units, the first sub-pixel is connected to the first gate line, the second sub-pixel and the third sub-pixel are connected to the second gate line. FIG. 14 illustrates examples of the first gate line G1, G2 and examples of the second gate line S1, S2.

As shown in FIG. 14, the array substrate includes a plurality of third gate lines GL and a plurality of second voltage lines PL, respective pixel units in a same row of pixel units of the plurality of pixel units are connected with a same third gate line GL of the plurality of third gate lines. Each second voltage line PL of the plurality of second voltage lines is electrically connected to a corresponding second voltage terminal, and respective sub-pixels of a same column of sub-pixels of the plurality of pixel units are connected to a same second voltage line PL of the plurality of second voltage lines. In some embodiments, the plurality of second voltage lines are configured to respectively provide constant voltages of different values to at least two sub-pixels of a row of pixel units of the plurality of pixel units in response to the plurality of pixel units being scanned by a control signal from the third gate line row by row.

In some embodiments, at least one second voltage line of the plurality of second voltage lines is configured to respectively provide constant voltages of different values to at least two sub-pixels of a column of sub-pixels of the plurality of pixel units, the column of sub-pixels of the plurality of pixel units is electrically connected with the at least one second voltage line.

In some embodiments, respective sub-pixels of a same column of pixel units of the plurality of pixel units are electrically connected to a same second voltage line of the plurality of second voltage lines, and the plurality of second voltage lines comprise at least two second voltage lines connected to different second voltage terminals respectively.

Another embodiment of the disclosure provides a display panel, the display panel comprises the array substrate as described in any of the foregoing embodiments.

In the array substrate provided by the embodiments of the disclosure, the first sub-pixels having a relatively low luminous efficiency in each row of pixel units are coupled to the first gate line, the second and third sub-pixels having a relatively high luminous efficiency in the row of pixel units are coupled to the second gate line. The first scanning signal and the second scanning signal are respectively supplied to the first gate line and the second gate line. Moreover, the duration of effective level of the first scanning signal is longer than that of the effective level of the second scanning signal. In this way, for the same row of pixel units, the time period during which the first sub-pixel emits light would be longer than the time period during which the second and third sub-pixels emit light, i.e., the first sub-pixel having a relatively low luminous efficiency may have a longer time period of emitting light, so as to compensate for brightness of the first sub-pixel, so that the first sub-pixel, the second sub-pixel and the third sub-pixel have a similar or substantially same brightness, thereby improving the display effect.

The display panel stated above may be any products or components having a displaying function such as an OLED television, a digital photo frame, a mobile phone or a flat computer, etc. The display panel has beneficial technical effects similar to the array substrates provided by the foregoing embodiments, which will not be discussed herein.

What have been described above are some embodiments of the disclosure, the scope of the application is not so limited. Any variances or modifications that are easily conceived by a person who is familiar with the skill in the art within the technical scope revealed herein should fall in the scope of the application. Therefore, the scope of the application should be subjected to the scope of the appending claims.

The invention claimed is:

1. A pixel circuit comprising: a first switching sub-circuit, a second switching sub-circuit, a gray scale control sub-circuit, a driving sub-circuit and a light-emitting element, wherein the first switching sub-circuit is electrically connected with a data line and the gray scale control sub-circuit, the first switching sub-circuit is further connected with a first gate line or a second gate line, the first switching sub-circuit is configured to transmit a data voltage from the data line to the gray scale control sub-circuit under control of a scanning signal from the first gate line or the second gate line, wherein the gray scale control sub-circuit is further electrically connected with an anode of the light-emitting element and the driving sub-circuit, the gray scale control sub-circuit is configured to control a duration during which the driving sub-circuit is electrically connected with the light-emitting element based on the data voltage, wherein the driving sub-circuit is electrically connected with a first operation voltage terminal to receive a first voltage from the first operation voltage terminal, wherein the second switching sub-circuit is electrically connected with a second voltage terminal, the driving sub-circuit and a third gate line, the second switching sub-circuit is configured to transmit a second voltage from the second voltage terminal to the driving sub-circuit under control of a control signal from the third gate line, wherein a cathode of the light-emitting element is electrically connected with a second operation voltage terminal, the driving sub-circuit is configured to provide a constant driving current to the light-emitting element under control of the second voltage from the second voltage terminal, and the light-emitting element is configured to emit light based on the driving current, wherein the first switching sub-circuit comprises a first transistor, a gate of the first transistor is electrically connected with the first gate line or the second gate line, a first terminal of the first transistor is electrically connected to the data line, and a second terminal of the first transistor is electrically connected to the gray scale control sub-circuit.

2. The pixel circuit according to claim 1, wherein the second voltage is a constant voltage.

3. The pixel circuit according to claim 2, wherein the second voltage enables the light-emitting element connected with the second voltage terminal to operate in a state of a highest luminous efficiency.

4. The pixel circuit according to claim 1, wherein the second voltage enables the light-emitting element connected with the second voltage terminal to operate in a state of a highest luminous efficiency.

5. The pixel circuit according to claim 1, wherein the gray scale control sub-circuit comprises a second transistor, a gate of the second transistor is electrically connected to the first switching sub-circuit, a first terminal of the second transistor is electrically connected to the driving sub-circuit, and a second terminal of the second transistor is electrically connected to the anode of the light-emitting element.

6. The pixel circuit according to claim 5, wherein the second switching sub-circuit comprises a third transistor, a gate of the third transistor is electrically with the third gate line, a first terminal of the third transistor is electrically with the second voltage terminal, and a second terminal of the third transistor is electrically with the driving sub-circuit.

7. The pixel circuit according to claim 6, wherein the driving sub-circuit comprises a driving transistor, a first terminal of the driving transistor is electrically with the first operation voltage terminal, and a second terminal of the driving transistor is electrically with the gray scale control sub-circuit.

8. The pixel circuit according to claim 7, wherein a width to length ratio of the driving transistor is greater than a width to length ratio of any one of the first transistor, the second transistor and the third transistor.

9. An array substrate, comprising a plurality of pixel units arranged in an array, wherein each pixel unit of the plurality of pixel units at least comprises a first sub-pixel, a second sub-pixel and a third sub-pixel that are configured to emit light of different colors, wherein each of the first sub-pixel, the second sub-pixel and the third sub-pixel comprises the pixel circuit according to claim 1, and a luminous efficiency of the first sub-pixel is lower than a luminous efficiency of each of the second sub-pixel and the third sub-pixel, and wherein in each row of pixel units of the plurality of pixel units, the first sub-pixel is connected to the first gate line, the second sub-pixel and the third sub-pixel are connected to the second gate line.

10. The array substrate according to claim 9, wherein the array substrate comprises a plurality of third gate lines comprising the third gate line and a plurality of second voltage lines, wherein respective pixel units in a same row of pixel units of the plurality of pixel units are connected with a same third gate line of the plurality of third gate lines, wherein each second voltage line of the plurality of second voltage lines is electrically connected to a corresponding second voltage terminal, and respective sub-pixels of a same column of sub-pixels of the plurality of pixel units are connected to a same second voltage line of the plurality of second voltage lines.

11. The array substrate according to claim 10, wherein the plurality of second voltage lines are configured to respectively provide constant voltages of different values to at least two sub-pixels of a row of pixel units of the plurality of pixel units in response to the plurality of pixel units being scanned by a control signal from the third gate line row by row.

12. The array substrate according to claim 10, wherein at least one second voltage line of the plurality of second voltage lines is configured to respectively provide constant voltages of different values to at least two sub-pixels of a column of sub-pixels of the plurality of pixel units, the column of sub-pixels of the plurality of pixel units is electrically connected with the at least one second voltage line.

13. The array substrate according to claim 10, wherein respective sub-pixels of a same column of pixel units of the plurality of pixel units are electrically connected to a same second voltage line of the plurality of second voltage lines, and wherein the plurality of second voltage lines comprise at least two second voltage lines connected to different second voltage terminals respectively.

14. The array substrate according to claim 9, wherein the light-emitting element of the pixel circuit comprises a micro LED.

15. A display panel comprising the array substrate according to claim 14.

* * * * *